(12) United States Patent
Kadoya et al.

(10) Patent No.: US 10,417,291 B2
(45) Date of Patent: Sep. 17, 2019

(54) INFORMATION PROCESSING APPARATUS AND PROGRAM THAT CONTROLS COMPUTER TO EXECUTE PROCESS IN THE INFORMATION PROCESSING APPARATUS

(71) Applicant: Alpine Electronics, Inc., Tokyo (JP)

(72) Inventors: Hidetoshi Kadoya, Tokyo (JP); Wataru Oikubo, Tokyo (JP); Taro Iwamoto, Tokyo (JP); Kiyozumi Fujiwara, Tokyo (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 355 days.

(21) Appl. No.: 15/091,033

(22) Filed: Apr. 5, 2016

(65) Prior Publication Data
US 2016/0314128 A1 Oct. 27, 2016

(30) Foreign Application Priority Data

Apr. 24, 2015 (JP) ................... 2015-089237

(51) Int. Cl.
*G06F 16/00* (2019.01)
*G06F 16/9535* (2019.01)
*G06F 16/248* (2019.01)

(52) U.S. Cl.
CPC ........ *G06F 16/9535* (2019.01); *G06F 16/248* (2019.01)

(58) Field of Classification Search
None
See application file for complete search history.

(56) References Cited

U.S. PATENT DOCUMENTS

2010/0153008 A1* 6/2010 Schwartz ............... G01C 21/20
 701/408
2011/0208617 A1 8/2011 Weiland
(Continued)

FOREIGN PATENT DOCUMENTS

JP 2008-032569 A 2/2008
JP 2014-025873 2/2014
(Continued)

OTHER PUBLICATIONS

U.S. Notification of Reasons for Refusal (English Translation) dated Jan. 8, 2019.
(Continued)

*Primary Examiner* — Son T Hoang
(74) *Attorney, Agent, or Firm* — Brinks Gilson & Lione (57) ABSTRACT

An information processing apparatus is configured to provide a result of a search according to a search input given via an input unit so as to provide, as the result of the search, information that matches registered user information associated with a particular registered user. The information processing apparatus includes a matching information search unit that retrieves information that matches the registered user information according to the search input, a matching level calculation unit that calculates a matching level, with respect to the registered user information, of the information obtained as the result of the search performed by the matching information search unit, and a search result providing unit that provides, together with the result of the search, the matching level with respect to the registered user information calculated by the matching level calculation unit.

8 Claims, 6 Drawing Sheets

| REGISTERED USER | TARO O-YAMA | HANAKO O-YAMA | △-O O-YAMA | △-KO O-YAMA |
|---|---|---|---|---|
| SMARTPHONE ID INFORMATION | PR23… | PP43… | KK73… | YU56… |
| FAMILY RELATIONSHIP AND AGE | OWNER, 40 | WIFE, 38 | SON, 16 | DAUGHTER, 10 |
| OCCUPATION OR THE LIKE | PUBLIC EMPLOYEE | HOMEMAKER, PART TIME WORKER | HIGH SCHOOL STUDENT | ELEMENTARY SCHOOL STUDENT |
| HOBBY | BASEBALL: A | GARDENING: B | SOCCER: A | READING BOOKS: A |
| FAVORITE FOODS | GRILLED MEAT: C  PIZZA: B  COFFEE: C | JAPANESE FOOD: A  STEAK: B  TEA: C | PASTA: A  RAMEN: C  COLA: B | SUSHI: A  HOT CHOCOLATE: A |
| FAVORITE (RADIO/TV) PROGRAM | BASEBALL GAME LIVE: A | MYSTERY DRAMA: C | IDOL: B | ANIME: B |
| FAVORITE MUSIC | ENKA AND THE LIKE: B  FOLK SONG: B | CLASSICAL MUSIC: B  POP: A | IDLE AND THE LIKE: B | ANIME MUSIC: B |
| FAVORITE SINGER | OO-KKO: B | OO-MKO: A | OO-PKO: C | △×-DO: C |
| LESSON OR THE LIKE | ENGLISH CONVERSATION: A | ---- | PAINTING: C | PIANO: C |

(56) References Cited

U.S. PATENT DOCUMENTS

| | | | | |
|---|---|---|---|---|
| 2011/0320375 A1* | 12/2011 | Zrike | ................... | G06Q 10/107 |
| | | | | 705/319 |
| 2014/0025673 A1* | 1/2014 | Sinha | ................... | G06Q 10/101 |
| | | | | 707/732 |
| 2015/0032505 A1* | 1/2015 | Kusukame | ......... | G06Q 30/0201 |
| | | | | 705/7.31 |
| 2015/0362988 A1* | 12/2015 | Yamamoto | .............. | G06F 3/011 |
| | | | | 345/156 |
| 2015/0377635 A1* | 12/2015 | Beaurepaire | ....... | G01C 21/3423 |
| | | | | 701/408 |
| 2016/0125248 A1* | 5/2016 | Lee | .......................... | G06T 7/20 |
| | | | | 382/103 |

FOREIGN PATENT DOCUMENTS

| | | |
|---|---|---|
| JP | 2014-025873 A | 2/2014 |
| JP | A2014-078182 | 5/2014 |
| WO | 2014/049720 | 8/2016 |

OTHER PUBLICATIONS

Office Action dated Nov. 13, 2018 from the corresponding Japanese application 2015-089237 and English translation.

\* cited by examiner

| REGISTERED USER | TARO ○-YAMA | HANAKO ○-YAMA | △-O ○-YAMA | △-KO ○-YAMA |
|---|---|---|---|---|
| SMARTPHONE ID INFORMATION | PR23… | PP43… | KK73… | YU56… |
| FAMILY RELATIONSHIP AND AGE | OWNER, 40 | WIFE, 38 | SON, 16 | DAUGHTER, 10 |
| OCCUPATION OR THE LIKE | PUBLIC EMPLOYEE | HOMEMAKER, PART TIME WORKER | HIGH SCHOOL STUDENT | ELEMENTARY SCHOOL STUDENT |
| HOBBY | BASEBALL: A | GARDENING: B | SOCCER: A | READING BOOKS: A |
| FAVORITE FOODS | GRILLED MEAT: C<br>PIZZA: B<br><br>COFFEE: C | JAPANESE FOOD: A<br>STEAK: B<br><br>TEA: C | PASTA: A<br>RAMEN: C<br><br>COLA: B | SUSHI: A<br><br><br>HOT CHOCOLATE: A |
| FAVORITE (RADIO/TV) PROGRAM | BASEBALL GAME LIVE: A | MYSTERY DRAMA: C | IDLE: B | ANIME: B |
| FAVORITE MUSIC | ENKA AND THE LIKE: B<br>FOLK SONG: B | CLASSICAL MUSIC: B<br>POP: A | IDLE AND THE LIKE: B | ANIME MUSIC: B |
| FAVORITE SINGER | ○○-K KO: B | ○○-M KO: A | ○○-P KO: C | △×-D O: C |
| LESSON OR THE LIKE | ENGLISH CONVERSATION: A | …… | PAINTING: C | PIANO: C |

INFORMATION PROCESSING APPARATUS AND PROGRAM THAT CONTROLS COMPUTER TO EXECUTE PROCESS IN THE INFORMATION PROCESSING APPARATUS

RELATED APPLICATIONS

The present application claims priority to Japanese Patent Application Serial Number 2015-089237, filed Apr. 24, 2015, the entirety of which is hereby incorporated by reference.

BACKGROUND

1. Field of the Invention

The present disclosure relates to an information processing apparatus configured to provide a result of a search according to a search input given via an input unit so as to provide, as the result of the search, information that matches registered user information associated with a particular registered user, and to a program that controls a computer to execute a process in the information processing apparatus.

2. Description of the Related Art

Some known information processing apparatuses such as a smartphone, a portable terminal, a navigation device, or the like have a capability of performing searching such that life logs, tastes, and/or the like of a user are analyzed by a server based on current and past history of operation, and recommended information matching the tastes or the like of the user is provided as a search result (see, for example, Japanese Unexamined Patent Application Publication No. 2014-78182).

An affinity-based user recommendation apparatus disclosed in Japanese Unexamined Patent Application Publication No. 2014-78182 is configured such that in a service such as a social networking service (SNS) that provides enhanced connections among people, an affinity level between an event or the like and each user is calculated based on properties of the user in terms of a profile, an affinity, and interest, and recommended information in terms of an event or the like suitable for the user is provided.

SUMMARY

The affinity-based user recommendation apparatus disclosed in Japanese Unexamined Patent Application Publication No. 2014-78182 is capable of providing recommended information in terms of an event or the like suitable for each user. However, in a case where a plurality of users use an information processing apparatus to receive the provided information, it is necessary to determine to which one of the users the recommended information displayed on a display unit is provided each time information is provided. For example, in a case where the information processing apparatus used to receive the recommended information is an in-vehicle device, if a driver tries to determine to which occupant the recommended information is provided, the driver has to perform a troublesome operation that may cause a problem in a driving operation. Thus such an affinity-based user recommendation apparatus is not good enough in convenience.

In view of the above, the present disclosure provides and information processing apparatus that allows it, in a situation in which a plurality of users receive recommended information as a search result, to easily understand to which one of the users the recommended information is provided.

The present disclosure also provides a program that controls a computer to execute a process in this information processing apparatus.

In view of the above, an aspect of the present disclosure provides an information processing apparatus configured to provide a result of a search according to a search input given via an input unit so as to provide information that matches registered user information associated with a particular registered user, including a matching information search unit that retrieves information that matches the registered user information according to the search input, a matching level calculation unit that calculates a matching level, with respect to the registered user information, of the information obtained as the result of the search performed by the matching information search unit, and a search result providing unit that provides, together with the result of the search, the matching level with respect to the registered user information calculated by the matching level calculation unit.

In this information processing apparatus configured in the above-described manner, the matching level of the result of the search with respect to the registered user information is calculated, and the calculated matching level is provided. Thus it is possible to easily understand which registered user information is related to the information provided as the search result and how well it is related thereto. For example, when a nearby search or the like is performed using an in-vehicle device realized by the information processing apparatus by one of a plurality of occupants who are registered users, the matching level of the result of the search with respect to the registered user information is provided, and thus it is possible to easily understand to which of the occupants the result of the search is provided and how well the result of the search matches a taste or the like of this occupant. Therefore, even a driver also can understand, at a glance, the result of the search and the matching level of the result of the search with respect to the registered user information without causing a problem in a driving operation.

The information processing apparatus according to the aspect of the present disclosure may further include a storage control unit that stores, in a storage unit, the registered user information as stored information including at least one of a taste and an action record of the registered user, and a registered user information acquisition unit that acquires the registered user information to be stored by the storage control unit via communication with a portable terminal of the registered user or by inputting performed by the registered user via the input unit.

In this configuration, the registered user information is stored as stored information including at least one of the taste and the action record of each registered user. This ensures that information useful for the registered user is provided as the result of the search. Furthermore, the registered user information is acquired via communication with the portable terminal possessed by the registered user or acquired by inputting performed by the registered user via the input unit, and thus the registered user information well related to the taste or the like of the registered user is acquired. When the registered user information is acquired by communication with the portable terminal, the registered user information is acquired directly from the portable terminal or the registered user information is acquired from SNS or the like performed by the portable terminal via a communication network.

In forms of the information processing apparatus, the registered user information acquisition unit may acquire the registered user information via the communication with the portable terminal of the registered user each time a predetermined time period elapses or each time an input is given by the registered user via the input unit, and the storage control unit may store the acquired registered user information in the storage unit thereby updating the registered user information.

In this configuration, the registered user information is acquired each time the predetermined time period elapses or each time an input is given via the input unit thereby updating the registered user information. Thus it becomes possible to provide a result of the search that matches the latest registered user information.

In forms of the information processing, the search result providing unit may include a display control unit that displays, together with the result of the search, the matching level with respect to the registered user information.

In this configuration, the matching level with respect to the registered user information is displayed together with the result of the search on the display unit. This makes it possible to easily understand, visually, which registered user information is related to the information provided as the result of the search and how well it is related thereto.

In forms of the information processing apparatus, when the result of the search obtained by the matching information search unit matches registered user information of a plurality of registered users, the matching level calculation unit may calculate the matching level with respect to the registered user information of each of the registered users, and the search result providing unit may provide, together with the result of the search, the matching level calculated by the matching level calculation unit with respect to the registered user information of each of the registered users.

In this configuration, when the result of the search matches registered user information of a plurality of registered users, the matching level with respect to the registered user information of each of the registered users is calculated, and the matching level is provided together with the registered user information of the plurality of registered users. This makes it possible to use the result of the search more effectively.

In forms of the information processing apparatus, the matching level calculation unit may calculate the matching level according to the degree of matching between the result of the search and the registered user information.

In this configuration, even in a case where there is a plurality of search results that match registered user information, the calculated matching level indicating the degree of matching with the registered user information makes it possible for the registered users to more effectively use the search results.

In another aspect, the present disclosure provides a program that controls a computer to execute a process in an information processing apparatus configured to provide a result of a search according to a search input given via an input unit so as to provide, as the result of the search, information that matches registered user information associated with a particular registered user, including the steps of retrieving information that matches the registered user information according to the search input, calculating a matching level, with respect to the registered user information, of the information obtained as the result of the search performed in the matching information search step, and providing, together with the result of the search, the matching level with respect to the registered user information calculated in the matching level calculation step.

The program that controls the computer may further include the steps of storing, in a storage unit, the registered user information as stored information including at least one of a taste and an action record of the registered user, and acquiring the registered user information to be stored in the storage control step via communication with a portable terminal of the registered user or by inputting performed by the registered user via the input unit.

In the program that controls the computer, the registered user information acquisition step may include acquiring the registered user information via the communication with the portable terminal of the registered user each time a predetermined time period elapses or each time an input is given by the registered user via the input unit, and the storage control step may include storing the acquired registered user information in the storage unit thereby updating the registered user information.

In the program that controls the computer, the search result providing step may include displaying, together with the result of the search, the matching level with respect to the registered user information.

In the program that controls the computer, the matching level calculation step may include, when the result of the search obtained in the matching information search step matches registered user information of a plurality of registered users, calculating the matching level with respect to the registered user information of each of the registered users, and the search result providing step may include providing, together with the result of the search, the matching level calculated in the matching level calculation step with respect to the registered user information of each of the registered users.

In the program that controls the computer, the matching level calculation step may include calculating the matching level according to the degree of matching between the result of the search and the registered user information.

In the present disclosure, the matching level of the result of the search obtained as the result matching the registered user information is calculated with respect to the registered user information, and the calculated matching level is provided. This makes it possible to easily understand which registered user information is related to the information provided as the result of the search and how well it is related thereto.

DETAILED DESCRIPTION OF THE DRAWINGS

Forms of the present disclosure are described below with reference to drawings.

Figure 1:
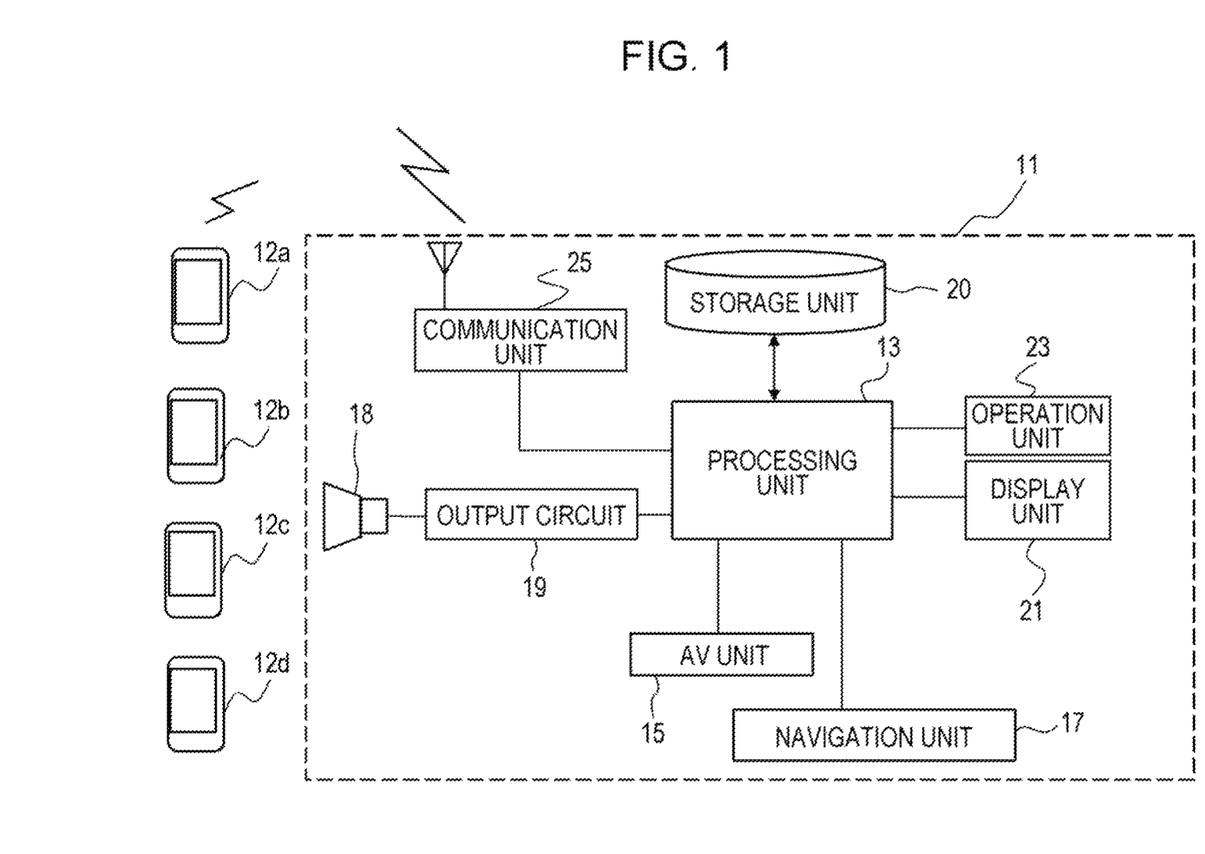
FIG. 1 is a block diagram illustrating a configuration of an information processing apparatus (in-vehicle device)

An information processing apparatus 11 is applied to an apparatus having a navigation function for use as an in-vehicle device, and a configuration thereof is illustrated in FIG. 1. In FIG. 1, the information processing apparatus 11 is connected via short-distance communication (for example, WiFi, Bluetooth (registered trademark), or the like) to smartphones 12 (12a, 12b, 12c, and 12d) possessed by occupants (an owner of the vehicle, his wife, his son, and his daughter) being on a vehicle (not shown).

The information processing apparatus 11 includes a processing unit 13 realized by a computer unit (including a CPU, a RAM, a ROM, an I/O interface, a bus, and the like). The processing unit 13 is connected to an AV unit 15 capable of performing a reproduction process on various kinds of audio sources and video sources (for example, CD, DVD, or the like) and a navigation unit 17 capable of providing navigation to the vehicle. Furthermore, the processing unit 13 is also connected to a speaker 18 via an output circuit 19. Thus, it is possible to output a voice/sound of an audio signal associated with a process performed by the AV unit 15 or the navigation unit 17 from the speaker 18 via the output circuit 19. Furthermore, it is also possible to output a search result (described later) in the form of a voice from the speaker 18 in addition to displaying an image of the search result. Furthermore, the processing unit 13 is also connected to a storage unit 20 (such as a hard disk, a flash memory, or the like) capable of storing various kinds of information such as music information or map information used by the AV unit 15 or the navigation unit 17, a display unit 21 such as an LCD or the like that displays an image or the like associated with a various kinds of processes, and an operation unit 23 provided in the form of a touch panel on the display unit 21 so as to allow for inputting a command necessary in various kinds of processes. Note that the operation unit 23 is not limited to the touch panel type, but a hard key input device or a combination of the touch panel and hard keys may be used. The storage unit 20 stores various kinds of programs (including a program for calculating the matching level with respect to the registered user information, and the like) to be executed by the processing unit 13 to perform a search operation. A search result is displayed on the display unit 21. The operation unit 23 may be used to input a keyword for the search, registered user information, or the like.

Furthermore, the processing unit 13 is connected to a communication unit 25 (including an antenna, a communication circuit, and the like) for performing short-distance communication with the smartphones 12 (12a, 12b, 12c, and 12d) or the like as described above. This makes it possible to transmit and receive information to and from the smartphones 12. Thus, for example, it becomes possible to determine whether a registered user having a smartphone 12 is on a vehicle. Furthermore, it becomes possible to store registered user information stored in the smartphone 12 into the storage unit 20.

In the information processing apparatus 11 configured in the above-described manner, the processing unit 13 performs a process according to a procedure shown in FIG. 2 as described below. In the following description, it is assumed by way of example that Taro O-yama is located in a driver's seat of a vehicle (not shown), his wife Hanako O-yama is in a front passenger seat, their son and daughter Jiro O-yama and Natsuko O-yama are in rear seats, and thus a total four people are on the vehicle (see FIG. 3). If the information processing apparatus 11 functioning as the in-vehicle device is operated after the people get in the vehicle, the processing unit 13 of the information processing apparatus 11 performs an occupant detection. The occupant detection is performed by the processing unit 13 by communicating via the communication unit 25 with the smartphones 12 (12a, 12b, 12c, and 12d) possessed by the occupant. If the processing unit 13 determines that an owner of a smartphone 12 is already registered in the registered user information of the information processing apparatus 11 (see FIG. 3), the processing unit 13 displays the detected occupant name or the like on the display unit 21 (S11). Thus the detected and displayed occupant is allowed to receive a search result matching a taste of the occupant as the registered user of the information processing apparatus 11.

Figure 3:
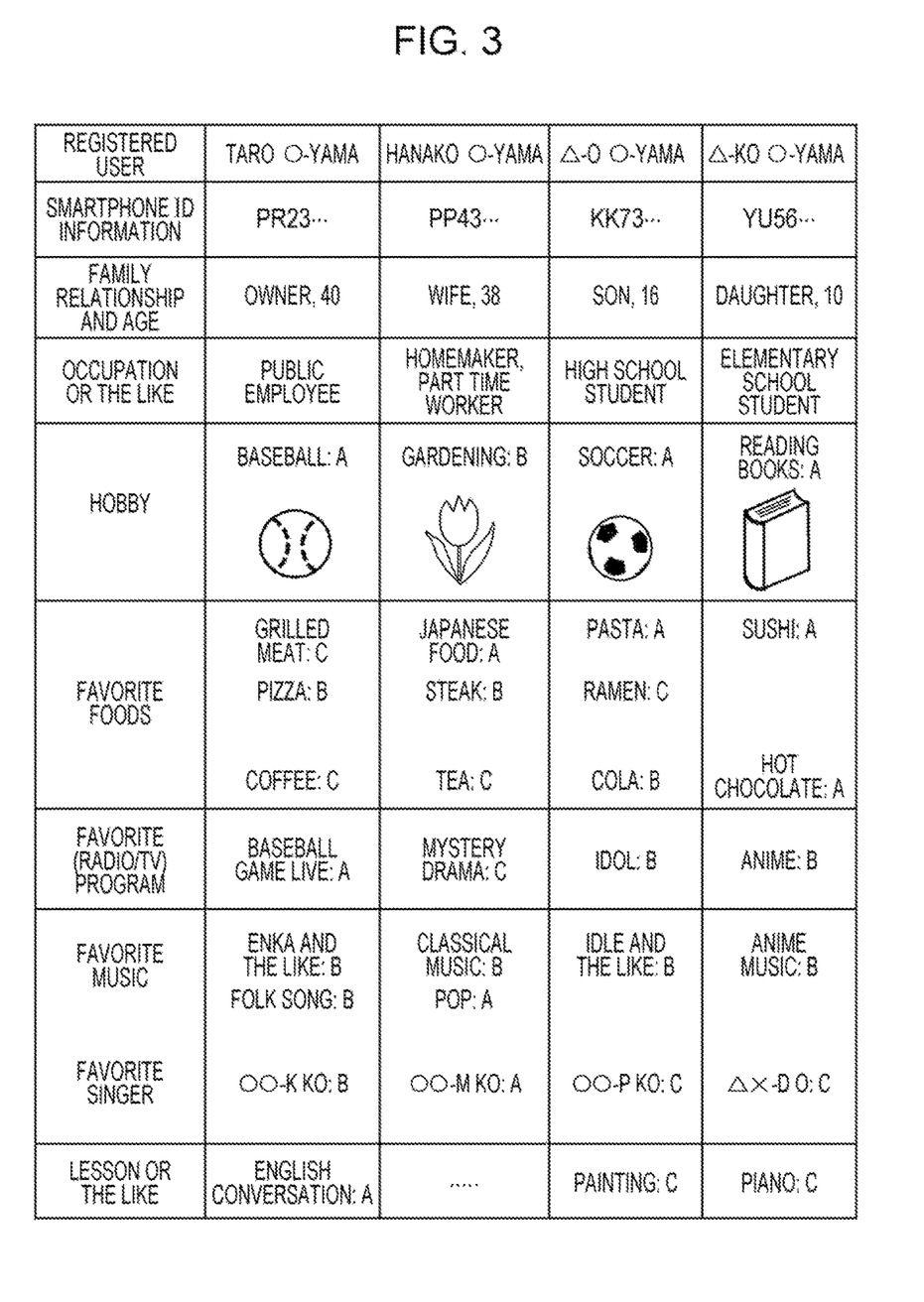
FIG. 3 is a diagram illustrating a list of registered user information in terms of a taste, an action record, and the like of registered users (occupants of a vehicles) using the information processing apparatus shown in FIG. 1.

As illustrated in FIG. 3, the registered user information stored in the storage unit 20 includes a name, a gender, an age, an occupation, and the like of each registered user, ID information or the like of a portable terminal such as a smartphone possessed by the registered user, a hobby, a favorite drink/food, a favorite radio/TV program or the like, favorite music (favorite genre of music), a favorite singer, a lesson or practice, and/or the like. The details of the registered user information are not limited to those described above, but registered users are allowed to arbitrarily set the registered user information. When a registered user is registered, various items of the registered user information may be directly input via the operation unit 23. If ID information of a smartphone or the like of the registered user is registered as registered user in the information processing apparatus 11, it becomes possible to acquire the registered user information via a network, for example, SNS. Therefore, after information such as an ID or the like of the smartphone is input when the registration is performed, the processing unit 13 of the information processing apparatus 11 may acquire additional information from SNS or the like via the communication unit 25 and the like thereby updating the registered user information. The information acquired from SNS or the like may include, for example, a name of a restaurant, a facility, or the like used by a registered user, favorite music, history of listening to music, and/or the like.

In the example shown in FIG. 3, the registered user information includes a favorite thing such as a hobby, a favorite drink/food, etc., of each registered user and information indicating the degree of preference thereof expressed in three levels of A, B, and C. In this three-level expression, the degree of preference is expressed, for example, such that "A" indicates "very favorite", "B" indicates "fairly favorite", and "C" indicates "favorite". The degree of preference may be directly input by a user when the user is registered, or the degree of preference for things appearing with a high frequency in SNS or the like may be displayed in three levels determined based on the occurrence frequency. For example, when the occurrence frequency is equal to or greater than 10 per week, the favorite level is set to A, when the occurrence frequency is equal to or greater than 5 per week, the favorite level is set to B, and when the occurrence frequency is equal to or lower than 4 per week, the favorite level is set to C. It is allowed to select whether the degree of preference in three levels is input directly or input based on information acquired from SNS or the like. For example, when Taro O-yama is registered as a user in the information processing apparatus 11, "live baseball game" is input as "favorite radio/TV program" and the degree of preference thereof is set to "B". Thereafter, when updating by acquiring information from SNS or the like is allowed, if the number of times a live baseball game is viewed or the number of times the user talks about live baseball games in SNS or the like is within a range set for the level A, then the degree of preference for the "live baseball game" is updated (changed) to the level A. Similarly, the favorite music, the favorite singer, the favorite drink/food, and the like are updated in terms of their degree of preference based on information acquired from SNS or the like at predetermined time intervals (according to the ranges set the therefor). Note that in a case where it is set such that the content of the registered user information is allowed to be input only via the operation unit 23, updating is also allowed only via the operation unit 23. Note that the number of levels of the degree of preference is not limited to three, but a greater number of levels may be allowed.

Figure 2:
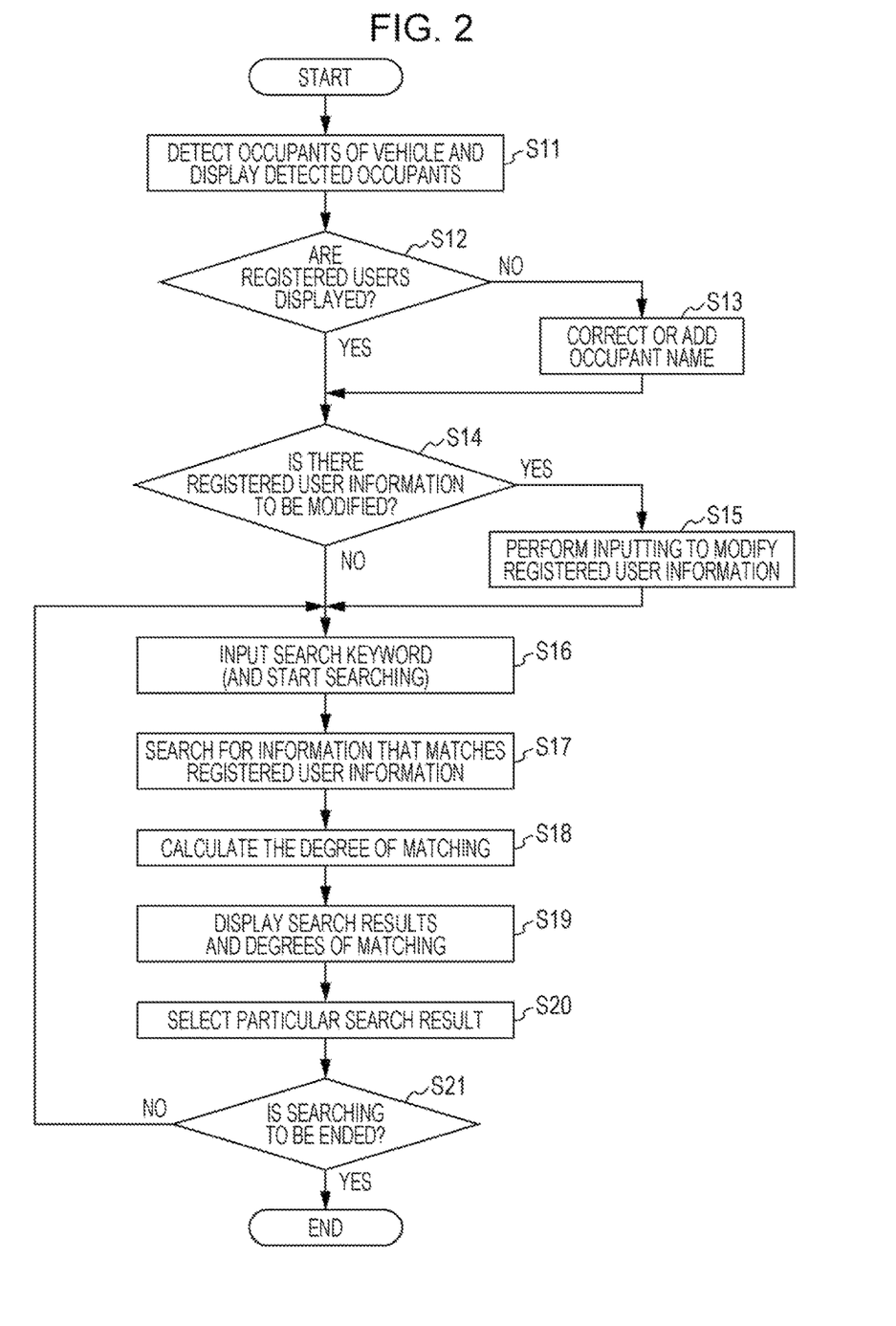
FIG. 2 is a flow chart illustrating a processing procedure performed by a processing unit of an information processing apparatus.

As illustrated in FIG. 2, the processing unit 13 acquires ID information via communication with smartphones 12a to 12d possessed by the respective four people being on the vehicle. If it is determined that the four people are registered users corresponding to the registered user information, then the processing unit 13 displays them on the display unit 21 as the registered users whom are allowed to receive service in terms of searching and the matching level (S11: with a display control unit). For example, in a case where communication is disabled between the information processing apparatus 11 and a smartphone of one of the four people, for example, the smartphone 12a of Taro O-yama because it is in the OFF state or for some other reason, the processing unit 13 displays three people other than Taro O-yama as registered users on the display unit 21.

The processing unit 13 determines whether the detected registered users are those whose names are displayed on the display unit 21 (S12). In the situation in which the names and the like of the three people other than Taro O-yama are displayed on the display unit 21 as described above, that is, in the situation in which Taro O-yama is not displayed, if a field indicating "NO" is clicked (NO in S12), then a correction input screen is displayed (S13). In the state in which the correct input screen is displayed, if ID information or the like of Taro O-yama is input via the operation unit 23, then Taro O-yama is regarded as a registered user and the name of Taro O-yama is additionally displayed on the screen. Instead of inputting the ID information or the like of Taro O-yama to the operation unit 23, if the smartphone 12a of Taro O-yama is activated into a state in which the smartphone 12a is capable of communicating with the information processing apparatus 11, then the information processing apparatus 11 may acquire the ID information of Taro O-yama from the smartphone 12a and may additionally display Taro O-yama as a registered user.

In a case where inputting is given to accept the information about the registered users displayed on the display unit 21 (YES in S12), or in a case where a denying input is given (NO in S12) and then a correction or an additional input is input (S13), the processing unit 13 displays the current registered user information and displays an inquiry message as to whether a correction is to be made or not (S14). For example, when "gardening" (with a degree of preference of B) is originally registered as a hobby for the registered user Hanako O-yama, if the current hobby is "dance" (with a degree of preference of A), then a correction may be made. For example, in a case where "Italian food" (with a degree of preference of A) is originally registered as a favorite drink/food for the registered user Natsuko O-yama, when the information processing apparatus 11 thereafter changes the favorite drink/food to "sushi" (with a degree of preference of A) which appears with a high occurrence frequency according to information acquired from SNS or the like, it is allowed to change the favorite drink/food to originally registered "Italian food" (with a degree of preference of A). When a correction is to be made in the current registered user information (NO in S14), inputting may be made to indicate that the correction is to be made and the correction of the registered user information may be made via the operation unit 23 (S15).

In a case where the processing unit 13 receives a response input to indicate that no correction of the registered user information is necessary (YES in S14) or in a case where the processing unit 13 receives a response indicating that a correction is to be made in the registered user information (NO in S14) and subsequently inputting is performed to make the correction (S15), the processing unit 13 starts searching according to an input search keyword or the like (S16).

Searching for nearby restaurants is described below as an example of the search according to the present embodiment. In a case where it becomes a time to take a meal during driving, and thus a nearby search is performed using "restaurant" as a search keyword (S16), the processing unit 13 searches for nearby restaurants matching a list of favorite drinks/foods described in the registered user information of four registered users (see FIG. 3) (S17: with a matching information search unit). When a result of the search for restaurants matching the registered user information is obtained, the matching level thereof with respect to the registered user information is calculated (S18: with a matching level calculation unit). The processing unit 13 then displays the search result together with the matching level with respect to the registered user information thereby providing such information (S19: with a search result providing unit, a display control unit). Thus the result of the search matching the registered user information is displayed and information indicating the degree of matching thereof is also provided, which makes it possible to provide the result of the search useful for the registered users.

More specifically, for example, in a case where when searching for nearby restaurants is performed based on the information described in the registered user information in terms of favorite drinks/foods of four people, the search result may indicate that there are "KK restaurant (Japanese food, sushi)", "Rome restaurant (pizza, pasta)", and "PP restaurant (sushi)". As for "KK restaurant (Japanese food, sushi)", "Japanese food A" is registered in relation to Hanako O-yama and "sushi A" is registered in relation to Natsuko O-yama, and thus two "A's" are displayed as the matching level. As for "Rome restaurant (pizza, pasta)", "pizza B" is registered in relation to Taro O-yama and "pasta A" is registered in relation to Jiro O-yama, and thus one "A" and one "B" are displayed as matching level. As for "PP restaurant (sushi)", "sushi A" is registered in relation to Natsuko O-yama, and thus one "A" is displayed as matching level.

Figure 4:
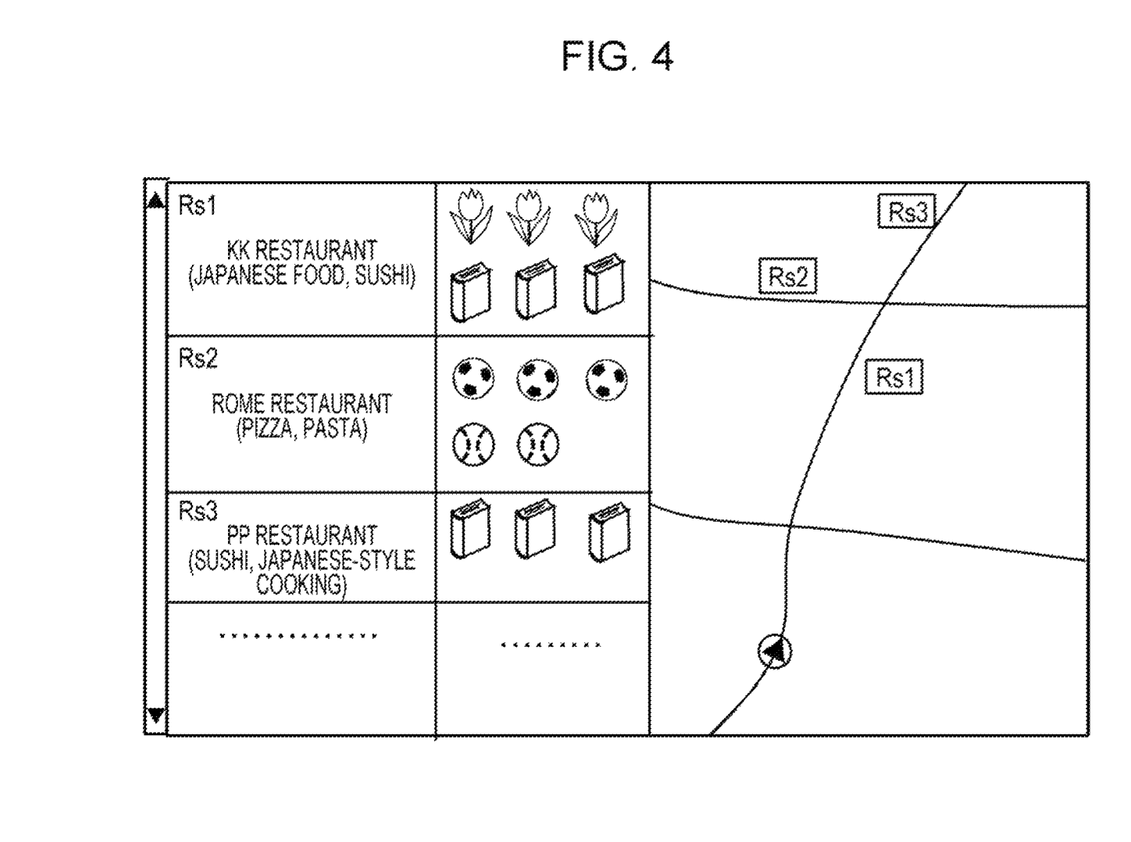
FIG. 4 is a diagram illustrating a first example of a manner in which a result of the search and a matching level thereof are displayed on a screen of a display unit of an information processing apparatus.

The search result of the nearby search is displayed together with the matching level on the screen of the display unit 21 as shown in FIG. 4. The result of the search is displayed from the top to the bottom in descending order of matching level. As described above, "KK restaurant (Japanese food, sushi)" is displayed at the top together with two highest-matching level "A's". To allow it to understand, at a glance, to which registered user information the search result is related, a pictorial symbol of "tulip flower" is displayed according to the fact that a hobby of Hanako O-yama is gardening, and a pictorial symbol of "a perspective view of a book" is displayed according to the fact that a hobby of Natsuko O-yama is reading. To indicate that the matching level is "A", three pictorial symbols of "tulip flower" are displayed and three pictorial symbols of "the perspective view of the book" are displayed. In a second row immediately below the top row, information associated with the second highest matching level is displayed as follows. That is, "Rome restaurant (pizza, pasta)" and, as the matching level associated therewith, one "A" and one "B" are displayed such that pictorial symbols of "soccer ball" (three pictorial symbols for indicating a matching level of "A"), which is a hobby of a corresponding registered user information Jiro O-yama, are displayed and pictorial symbols of "baseball" (two pictorial symbols for indicating a matching level of "B"), which is a hobby of a corresponding registered user information Taro O-yama, are displayed. Furthermore, in a third row, information associated with the third highest matching level is displayed as follows. That is, "PP restaurant (sushi)" and, as the matching level associated therewith, one "A" are displayed such that pictorial symbols of "perspective view of book" (three pictorial symbols for indicating a matching level of "A"), which is a hobby of a corresponding registered user information Natsuko O-yama, are displayed. This makes it possible to understand, at a glance, to whom and how well the result of the search is related. Thus even the driver Taro O-yama is also allowed to understand the information without causing a problem in driving operation, which makes it possible to effectively use the result of the search. Furthermore, the result of the search of the nearby search includes a map displayed in a part of the screen of the display unit 21 to indicate the locations of the retrieved facilities (stores), which makes the result of the search more useful.

Figure 6:
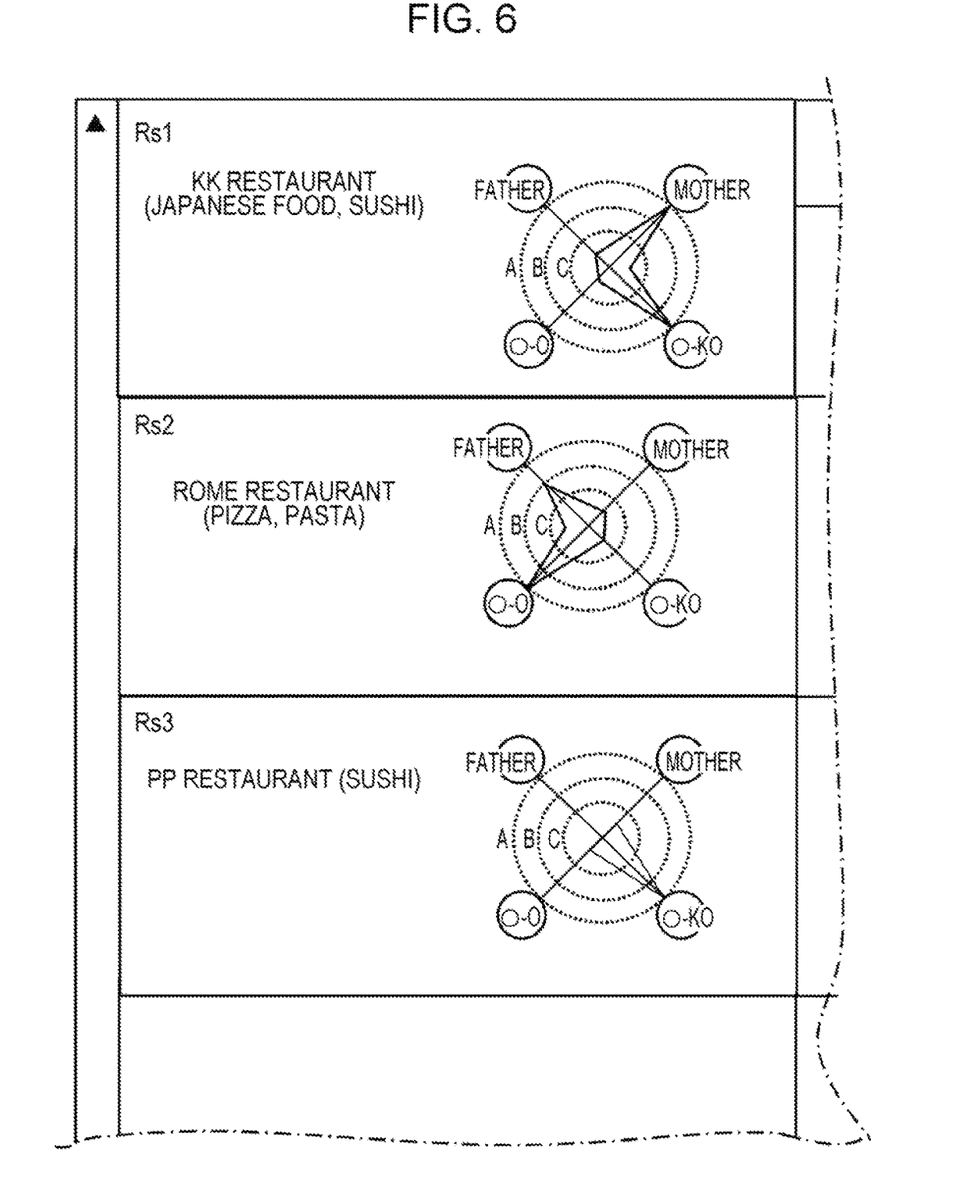
FIG. 6 is a diagram illustrating a third example of a manner in which a result of the search and a matching level thereof are displayed on a screen of a display unit of an information processing apparatus.

Instead of displaying the result of the search in the manner shown in FIG. 4, the result of the search may be displayed as shown in FIG. 6. In this example, the three matching levels, A, B, and C, are respectively represented by three concentric circles (represented by broken lines) with different diameters and a wedge-shaped line. To represent which registered user's registered user information is related to the matching level, the four people are represented at locations on corresponding concentric circles and in different radial directions. As shown in FIG. 6, as for "KK restaurant (Japanese food, sushi)" with the highest matching level displayed in the top row, Hanako and Natsuko are both "A" in the matching level, and thus wedges are displayed so as to extend from the center of the concentric circles to the locations of Hanako and Natsuko on the circumference of the circle A. This makes it possible to easily understand that "KK restaurant (Japanese food, sushi)" matches Hanako with a matching level of A and Natsuko with a matching level of A. In the example shown in FIG. 6, the four peoples are respectively denoted by "Taro", "Hanako", "Jiro", and "Natsuko", but they may be denoted by pictorial symbols as in FIG. 4. In a similar manner to the above example, "Rome restaurant (pizza, pasta)" is displayed in the second row such that a wedge is displayed so as to extend from the center in a direction to a location of Taro on a circumference of the circle B thereby indicating that Taro has a matching level of B, and a wedge is displayed so as to extend from the center in a direction to a location of Jiro on the circumference of the circle A thereby indicating that Jiro has a matching level of A. In the third row as counted from the top row, "PP restaurant (sushi)" is displayed such that a wedge is displayed so as to extend from the center in a direction to a location of Natsuko on the circumference of the circle A thereby indicating that Natsuko has a matching level of A. By displaying the information in the above-described manner, it becomes possible to easily understand to whom and how well the result of the search is related. That is, it is easier to recognize the content of the result of the search on the screen than is allowed by the conventional technique.

Figure 5:
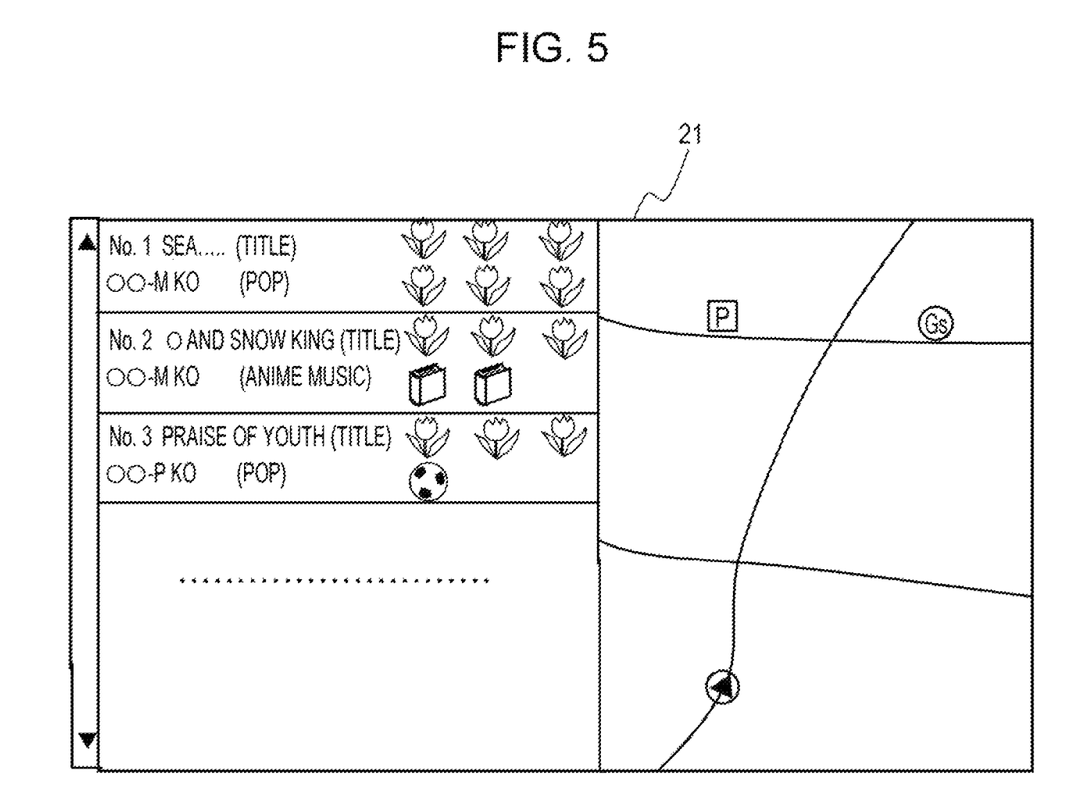
FIG. 5 is a diagram illustrating a second example of a manner in which a result of the search and a matching level thereof are displayed on a screen of a display unit of an information processing apparatus.

In a next example described below with reference to FIG. 5, music information is searched for by Hanako during driving, and a result of search is provided to allow Hanako to select music. In the music selection search, keywords are input such that "pop" is input as a music genre and "OO-M ko" as a singer. As a result of the search, following pieces of music are hit: (1) title: " . . . in sea", genre: pop, singer: OO-M ko; (2) title: " . . . and snow king", genre: anime music, singer OO-M ko; and (3) title: "Praise of Youth", genre: pop, singer: OO-P ko, where the matching level is highest (1) and lowest in (3). The music and the singer of (1) are favorite ones of Hanako, and the matching level of the music and that of the singer are both "A" (two A's) and thus a total of 3×2=6 pictorial symbols of "tulip flower" indicating Hanako are displayed. As for the music of (2), the matching level is A in terms of Hanako's favorite singer (one A) and the matching level is B in terms of Natsuko's favorite music (one B), and thus three pictorial symbols of "tulip flower" and two pictorial symbols of "perspective view of book" are displayed. As for the music of (3), the matching level is A in terms of Hanako's favorite music (one A) and the matching level is C in terms of Jiro's favorite singer (one C), and thus three pictorial symbols of "tulip flower" and one pictorial symbol of "soccer ball" are displayed. Thus it is possible to easily understand, from the information displayed on the screen, to whom the matching levels of the retrieved titles, genres, and singers of music are related, and thus, for example, even the driver can understand and use the information without causing a problem in driving operation. Also in this case, instead of displaying pictorial symbols, the three matching levels, A, B, and C, may be respectively represented by three concentric circles with different diameters and a wedge-shaped line as shown in FIG. 6.

After the processing unit 13 displays the search result together with the matching level with respect to the registered user information thereby providing such information (S19: with search result providing unit, display control unit), the processing unit 13 provides particular service in response to a selection made by a registered user (S20). Thereafter if an operation is performed by a registered user to end the search, then the processing unit 13 ends the process (YES in S21). In a case where a search input is given again, the matching level between the registered user information and the search keyword or the like is calculated, and the calculated matching level is displayed together with the search result thereby providing such information.

In some forms, as described above, the matching level with respect to the registered user information is displayed together with the result of the search. This makes it possible to understand, at a glance, to whom and how well the result of the search is related, thus it is possible to quickly understand whose taste the search result matches and how well it matches. Therefore, it is possible to quickly and effectively use the result of the search. In the embodiment described above, it is assumed by way of example that the information processing apparatus is an in-vehicle device having a navigation function. However, the information processing apparatus is not limited to such an in-vehicle device. For example, the information processing apparatus may be a portable terminal. Furthermore, the information processing apparatus may be connected to a server via a wireless communication line or the like, and the matching level between the result of the search and the registered user information may be calculated by the server. In the embodiment described above, it is assumed by way of example that the result of the search that matches the registered user information is provided together with the matching level. However, what is provided is not limited to information that matches the registered user information, but information obtained as a result of search based on a search keyword may also be provided. In the forms described above, it is assumed by way of example that the degree of matching is represented by the number of pictorial symbols indicating registered user information. Alternatively, the matching level may be represented by a combination of a user name and a segment of line whose length varies stepwise depending on the matching level.

In forms of the information processing apparatus, as described above, when information matching registered user information is obtained as a result of a search, the matching level of the obtained information with respect to the registered user information is calculated and provided, and thus it is possible to easily understand which registered user information the information provided as the result of the search is related to and how well the information is related thereto. Thus the information processing apparatus is useful to search for information according to a search input given via an input unit and provide a search result that matches user information associated with a particular registered user.

It is therefore intended that the foregoing detailed description be regarded as illustrative rather than limiting, and that it be understood that it is the following claims, including all equivalents, that are intended to define the spirit and scope of this invention.

What is claimed is:

1. An information processing apparatus of an in-vehicle navigation device that is configured to provide a result of a search according to a search input provided via an input unit so as to provide, as the result of the search, information that matches one or more preferences identified in registered user information associated with at least two registered users of a plurality of registered users present in a vehicle, comprising:
   a processor configured to execute a set of instructions stored in a storage medium and to:
      retrieve the information based on the search input that matches one or more preferences identified in the registered user information associated with the at least two registered users of the plurality of registered users present in the vehicle;
      calculate a matching level of the retrieved information obtained as the result of the search performed by the processor, wherein the processor is configured to calculate the matching level with respect to the one or more preferences identified in the registered user information and for each of the at least two registered users of the plurality of registered users present in the vehicle;
      provide, together with the result of the search, the matching level with respect to the one or more preferences identified in the registered user information and for each of the at least two registered users of the plurality of registered users present in the vehicle; and
      display, together with the result of the search, the matching level for each of the at least two registered users based on the registered user information.

2. The information processing apparatus according to claim 1, wherein the processor is further configured to:
   store, in a storage medium, the registered user information as stored information including at least one of a preference or an action record of a registered user of the plurality of registered users; and
   acquire the registered user information to be stored by the processor via communication with a portable terminal of the registered user of the plurality of registered users or through input performed by the registered user of the plurality of registered users.

3. The information processing apparatus according to claim 2, wherein the processor is further configured to:
   acquire the registered user information via the communication with the portable terminal of the registered user each time a predetermined time period elapses or each time an input is performed by the registered user; and
   store the acquired registered user information in the storage unit thereby updating the registered user information.

4. The information processing apparatus according to claim 1, wherein the processor is configured to calculate the matching level according to a degree of matching between the result of the search and the registered user information.

5. A non-transitory storage medium storing a program that controls a hardware computer processor to execute a process in an information processing apparatus configured to provide a result of a search according to a search input given via an input unit so as to provide, as the result of the search, information that matches one or more preferences identified in registered user information associated with at least two registered users of a plurality of registered users present in a vehicle, the program causing the computer processor to perform acts of:
   retrieving the information based on the search input that matches the one or more preferences identified in the registered user information associated with the at least two registered users of the plurality of registered users present in the vehicle;
   calculating a matching level of the retrieved information obtained as the result of the search performed in the matching information search step, where the matching level is calculated with respect to the one or more preferences identified in the registered information and for each of the at least two registered users of the plurality of registered users present in the vehicle;
   providing, together with the result of the search, the matching level with respect to the one or more preferences identified in the registered user information and for each of the at least two registered users of the plurality of registered users present in the vehicle; and
   displaying, together with the result of the search, the matching level for each of the at least two registered users based on the registered user information.

6. The non-transitory storage medium of claim 5, where the program further causes the processor to perform acts of:
   storing, in a storage medium, the registered user information as stored information including at least one of a preference or an action record of a registered user of the plurality of registered users; and
   acquiring the registered user information to be stored in the storage control step via communication with a portable terminal of the registered user of the plurality of registered users or through input performed by the registered user of the plurality of registered users.

7. The non-transitory storage medium of claim 6, wherein:

the registered user information acquisition step includes acquiring the registered user information via the communication with the portable terminal of the registered user each time a predetermined time period elapses or each time an input is given by the registered user; and the storage control step includes storing the acquired registered user information in the storage unit thereby updating the registered user information.

8. The non-transitory storage medium of claim 5, wherein the matching level calculation step includes calculating the matching level according to a degree of matching between the result of the search and the one or more preferences identified in the registered user information.

\* \* \* \* \*